H. H. GUNKEL.
MEASURING DEVICE.
APPLICATION FILED JUNE 24, 1921.
1,419,374. Patented June 13, 1922.
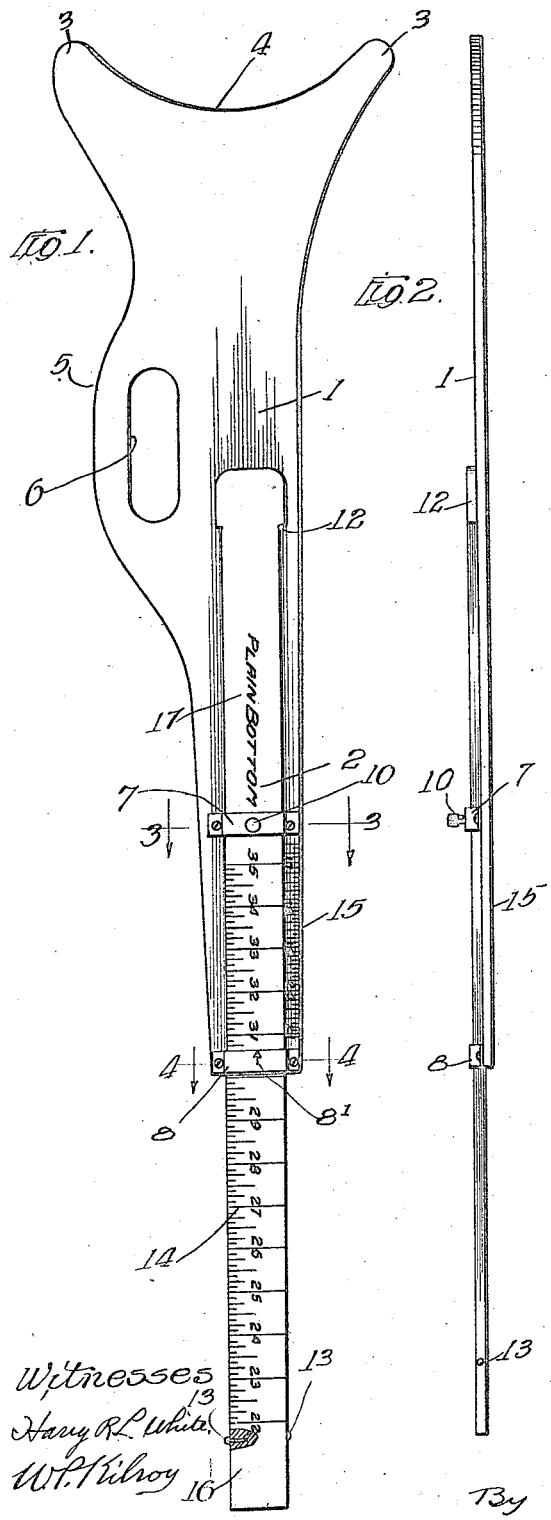
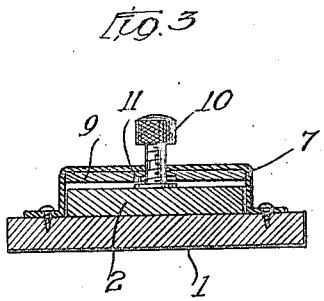
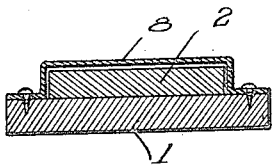
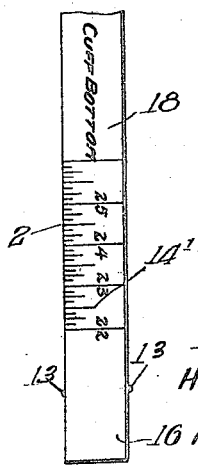
Inventor:
Harry H. Gunkel

UNITED STATES PATENT OFFICE.

HARRY H. GUNKEL, OF CHICAGO, ILLINOIS.

MEASURING DEVICE.

1,419,374.  Specification of Letters Patent.  Patented June 13, 1922.

Application filed June 24, 1921. Serial No. 480,150.

*To all whom it may concern:*

Be it known that I, HARRY H. GUNKEL, a citizen of the United States, residing at Chicago, in the county of Cook and State of Illinois, have invented certain new and useful Improvements in Measuring Devices, of which the following is a description.

My invention belongs to that general class of devices known as measuring devices, and relates particularly to a measuring stick particularly adapted for measuring the inseam on trousers, but the same may be used wherever found applicable. The invention has among its objects the production of a device of the kind described that is simple, compact, convenient, durable, accurate, efficient and satisfactory wherever found applicable.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Fig. 1 is a face elevation of my improved device;

Fig. 2 is an edge elevation of the same;

Fig. 3 is a sectional view taken substantially on the line 3—3 of Fig. 1;

Fig. 4 is a sectional view taken substantially on line 4—4 of Fig. 1; and

Fig. 5 is a view in elevation of the reverse side of the adjustable portion 2.

Referring to the drawings, in which the preferred embodiment of my measuring device is shown, 1 represents what may be termed a crotch-engaging member, and 2 a scale member adjustably carried thereby. The member 1 is preferably formed substantially as shown in Fig. 1, with the extending portions 3—3 at one end and formed with a socket or inwardly cut as indicated at 4. By cutting the same inwardly, as at 4, the same substantially fits the crotch and may be accurately fitted when it is desired to use it.

As shown, part 1 is also preferably extended at one side and a hole 6 formed therethrough so as to provide a handle portion 5.

The adjustable scale portion 2 is movable, as shown, adjustably and slidably secured on the part 1 by members 7 and 8, or their equivalents for the purpose. One of the members, as shown, member 7, is provided with means for clamping or securing member 2 against movement after the measurement is taken and before reading the scale and also to maintain the parts compacted together when not in use. As shown, a simple arrangement consists of a thumb screw 10 provided with a scale member engaging head 11. I have shown the plate 7 reinforced by plate 9, which is recessed to receive the head 11 when the thumb screw is turned back to release the scale member 2. If desired, the scale member may be provided with shoulders 12, or the equivalent, so as to afford a stop to limit the outward movement of the scale member and with pins 13, or the equivalent, arranged to form a stop at the free or outer end and limit the folding of the device when the slide is pushed inwardly.

As shown, the scale member 2 is provided with graduations 14, and in this connection it may be mentioned that these represent additions to the length of the portion 1, and are so arranged that a direct reading may be taken without calculation. Member 1 may be provided with a fixed indication point, or either one of the edges of the member 7 or 8 may be employed for the purpose. Ordinarily I prefer to use the fastening member 8 for this purpose and I have illustrated the edge 8' (indicated by an arrow) at the point at which the reading is to be taken. The particular part 1 illustrated measures up to substantially twenty-two inches in length and the member 2 is shown with a scale adapted to indicate up to thirty-five inches. If desired, the member 1 may be provided with a scale, as indicated at 15. With the device constructed as shown, a slight allowance is made at the outer end of the part 2 to allow for the thickness of the fastening member 8, and I have shown an additional extension beyond the stop 13 of substantially an inch and a half, or the desired distance, which is an allowance usually made by tailors and may be described as "the seal seam of the show allowance in length."

The face of the scale 2 shown in Fig. 1, as indicated at 17, I have marked as "Plain bottom," indicating that measurements for plain bottom style of trousers are to be read from the scale on this side. While the tailor can subtract from the measurement the desired distance that trousers are of the cuff bottom style, the reverse side of the scale member 2 may be provided with readings 14'. In this case, however, I prefer to mark this side of the scale with the words "Cuff bottom," as indicated at 18 (see Fig. 5). On this side, however, where an allowance is to be made for a cuff bottom, and this is usually about two and one-half inches as allowed by the tailors, but may be as desired, the scale is set back so that this allowance is made without calculation.

In use, when it is desired to take the measurement of the inseam, the thumb nut is loosened so that the scale member 2 is not locked and the device fitted to the inner side of the leg with the inwardly cut portion 4 fitting tightly the crotch and the portion 2 lowered or permitted to drop to the floor. The thumb nut is then tightened, or the parts may be held in operative relation by the hand and the reading taken.

If the trousers are to be "Plain bottom" style, the reading is taken from the scale 14, while if they are to be "cuff bottom" style, the reading is made from the scale 14'. However, as previously mentioned, only the scale 14 may be employed if desired. The extending part 16 may or may not be employed, as desired. In other words, this may be varied, as may be preferred.

For sleeve lengths, or the like, reading may be made from the scale 15, or scale 14, as desired. The same may be made in the desired size, shape, and of any suitable material.

While I have particularly mentioned the device as convenient and efficient for the measuring of the inseam on men's trousers, the same is also particularly convenient and desirable for use by ladies' tailors, especially in taking measurements for riding habits and the like.

Having thus described my invention, it is obvious that various immaterial modifications may be made in the same without departing from the spirit of my invention; hence I do not wish to be understood as limiting myself to the exact form, arrangement, construction and combination of parts herein shown and described, or uses mentioned.

What I claim as new and desire to secure by Letters Patent is:

1. A measuring instrument of the kind described, comprising a crotch-engaging member cut inwardly at one end and a pair of spaced guides thereon, an extensible member slidable through said guides, and means on one of said guides for maintaining said extensible member at any point of its sliding movement relative to the crotch-engaging member.

2. A measuring instrument of the kind described, comprising a crotch-engaging member cut inwardly at one end and being of a fixed predetermined length, a pair of spaced guides on said member, and a cooperating measuring member slidable through said guides, means for securing said slidable member at any point of its sliding movement, and a pair of stops carried by said sliding member and engageable with said guides for limiting its movement in both directions relative to said crotch-engaging member.

3. A measuring instrument of the kind described, comprising a crotch-engaging member having a handle thereon, guides on said member, a scale portion slidable on said crotch-engaging member through said guides so as to vary the overall length from the crotch-engaging portion thereof to the outermost end of the scale member, said scale member having graduated markings thereon and stops on said slidable member engageable with said guides to limit the movement of the slidable member therethrough in opposite directions.

4. An inseam measuring stick having a fixed predetermined length, and having a crotch-engaging socket at one end thereof, and a hand hole adjacent one side, a pair of spaced guides on said member, and an extensible member slidable through said guides, said slidable member having scale marks thereon, the lowermost guide being substantially at the extreme end of said crotch-engaging member and serving as a reference line for reading said scale on the slidable member.

In testimony whereof, I have hereunto signed my name in the presence of two subscribing witnesses.

HARRY H. GUNKEL.

Witnesses:
Roy W. Hill,
Ruth M. Ephraim.